United States Patent [19]

Johnson

[11] Patent Number: 4,531,865
[45] Date of Patent: Jul. 30, 1985

[54] TAPPING ATTACHMENT ADAPTED FOR NUMERICAL COMPUTER CONTROL

[75] Inventor: Allan S. Johnson, Newport Beach, Calif.

[73] Assignee: Tapmatic Corporation, Irvine, Calif.

[21] Appl. No.: 400,449

[22] Filed: Jul. 21, 1982

[51] Int. Cl.³ .............................................. B23B 47/24
[52] U.S. Cl. .................................. 408/139; 10/141 H
[58] Field of Search ......... 408/139; 10/141 H, 129 R, 10/89 H

[56] References Cited

U.S. PATENT DOCUMENTS

| | | | |
|---|---|---|---|
| 3,656,858 | 4/1972 | Eriksson | 408/139 |
| 3,717,892 | 2/1973 | Johnson | 10/141 H X |
| 3,787,136 | 1/1974 | Steiner | 408/139 |

FOREIGN PATENT DOCUMENTS 2801825  7/1979  Fed. Rep. of Germany ... 10/141 H

*Primary Examiner*—William R. Briggs
*Assistant Examiner*—Glenn L. Webb
*Attorney, Agent, or Firm*—Herzig, Schapp & Yanny

[57] ABSTRACT

A tapping attachment particularly adapted for use with machines under numerical computer control. The attachment embodies tension cushion for the spindle by way of a tension spring as well as compression cushion for the spindle. The compression cushion is provided by way of an adjustable spring member which is in a bore of the spindle and which has a helical spring formed in it. The tension spring is on the inside of the compression spring member. The attachment as a whole is of relatively short overall length, adapting it for use in an automated system wherein attachments are automatically inserted in the machine and interchanged. The attachment embodies a hard start feature provided by way of releasable securement which will release the spindle for movement in response to predetermined axial force, so that in the case of a dull tap the automated movement of the attachment under computer control will be kept accurately programmed. In one form of the invention the releasable securement is between the spindle and the body of the attachment. In a second form of the invention the releasable securement is between the spindle and the compression spring member carried within the spindle.

3 Claims, 8 Drawing Figures

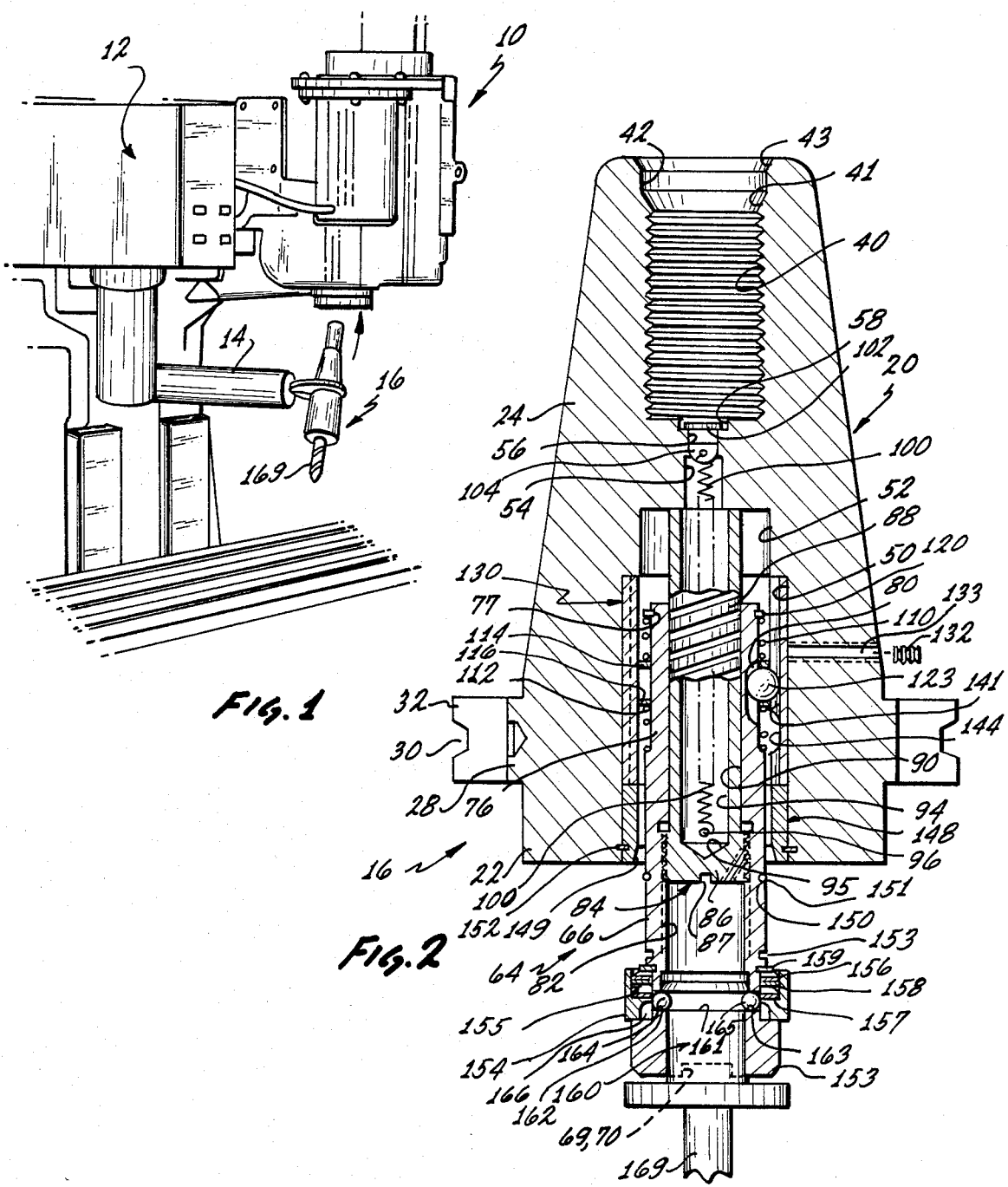

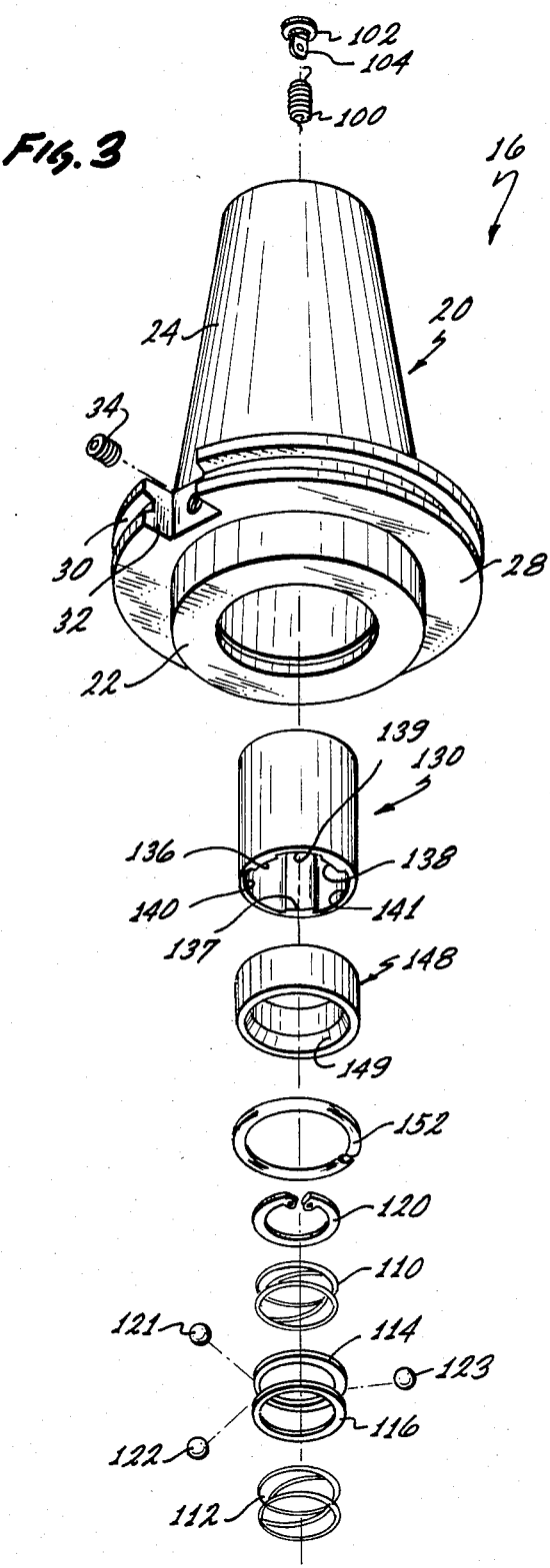
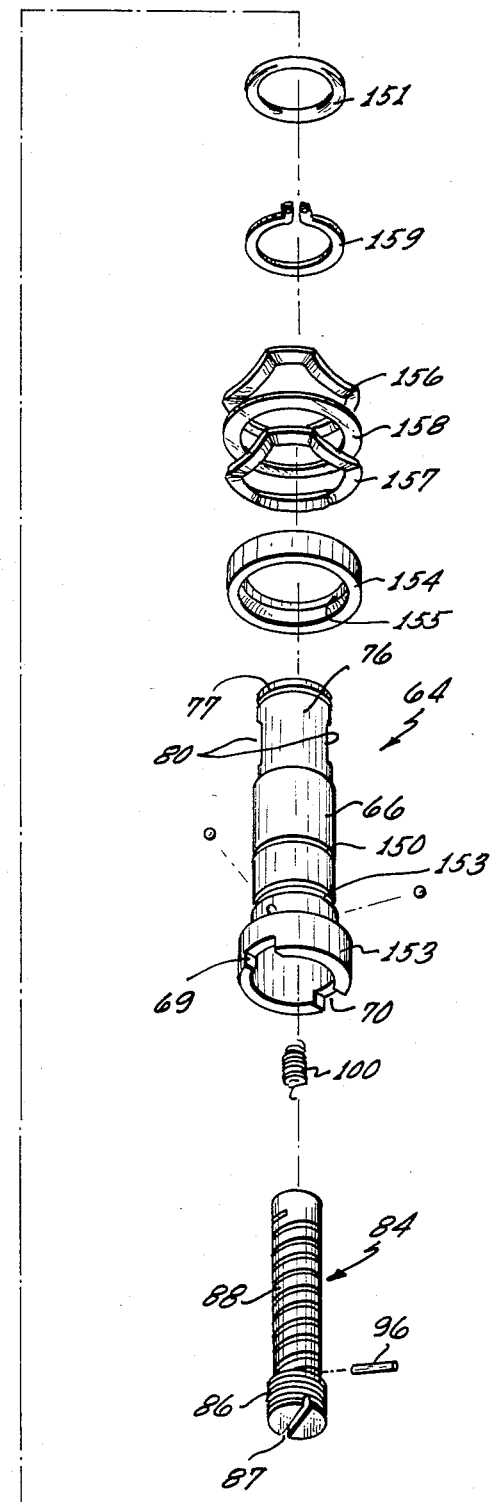
Fig. 3

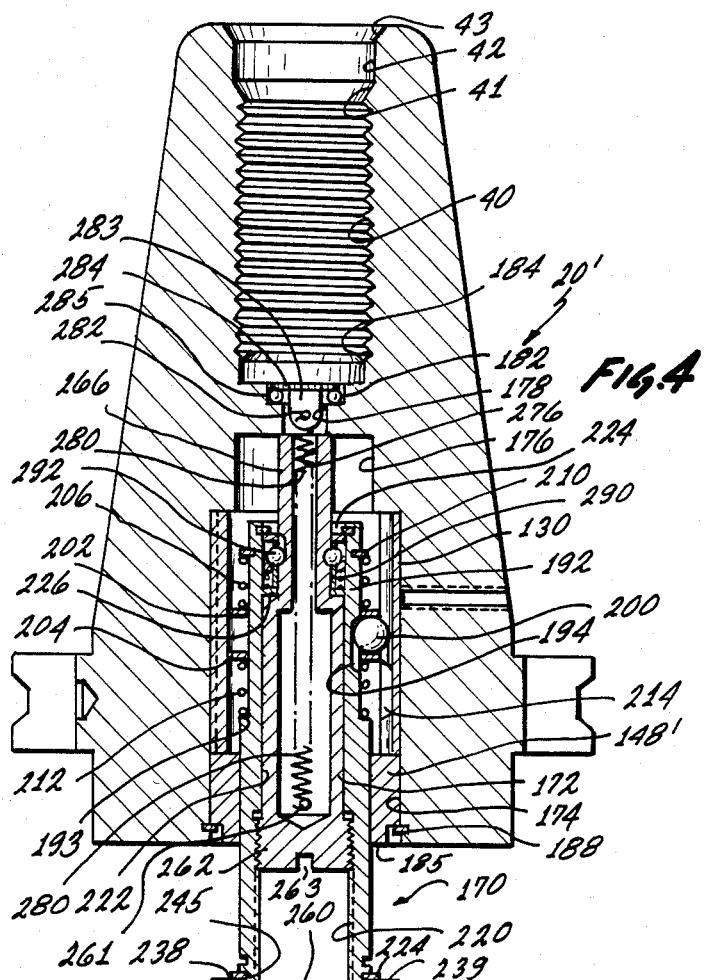
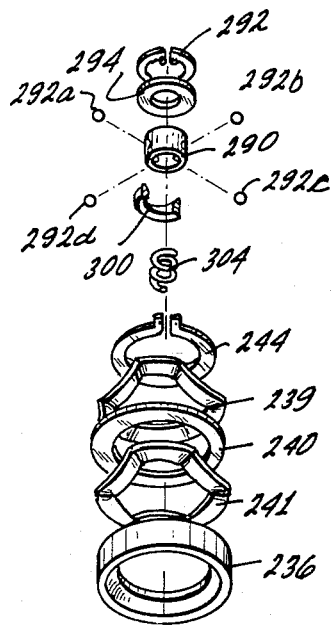
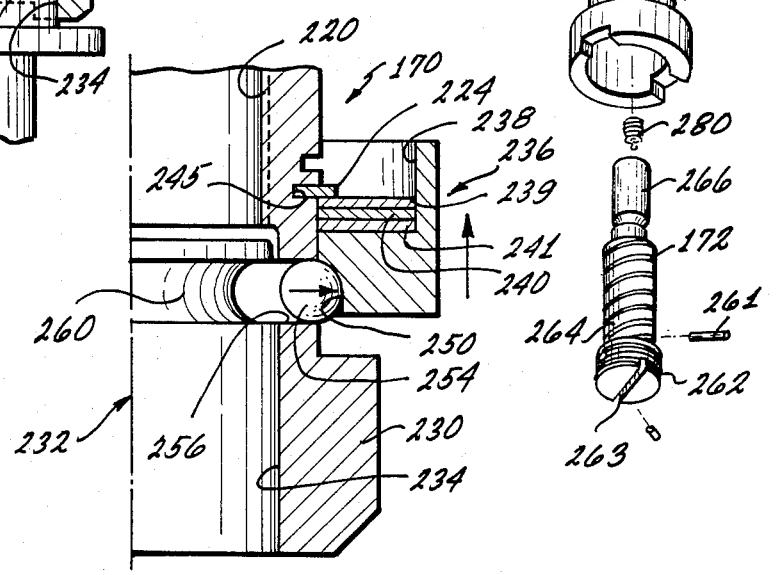

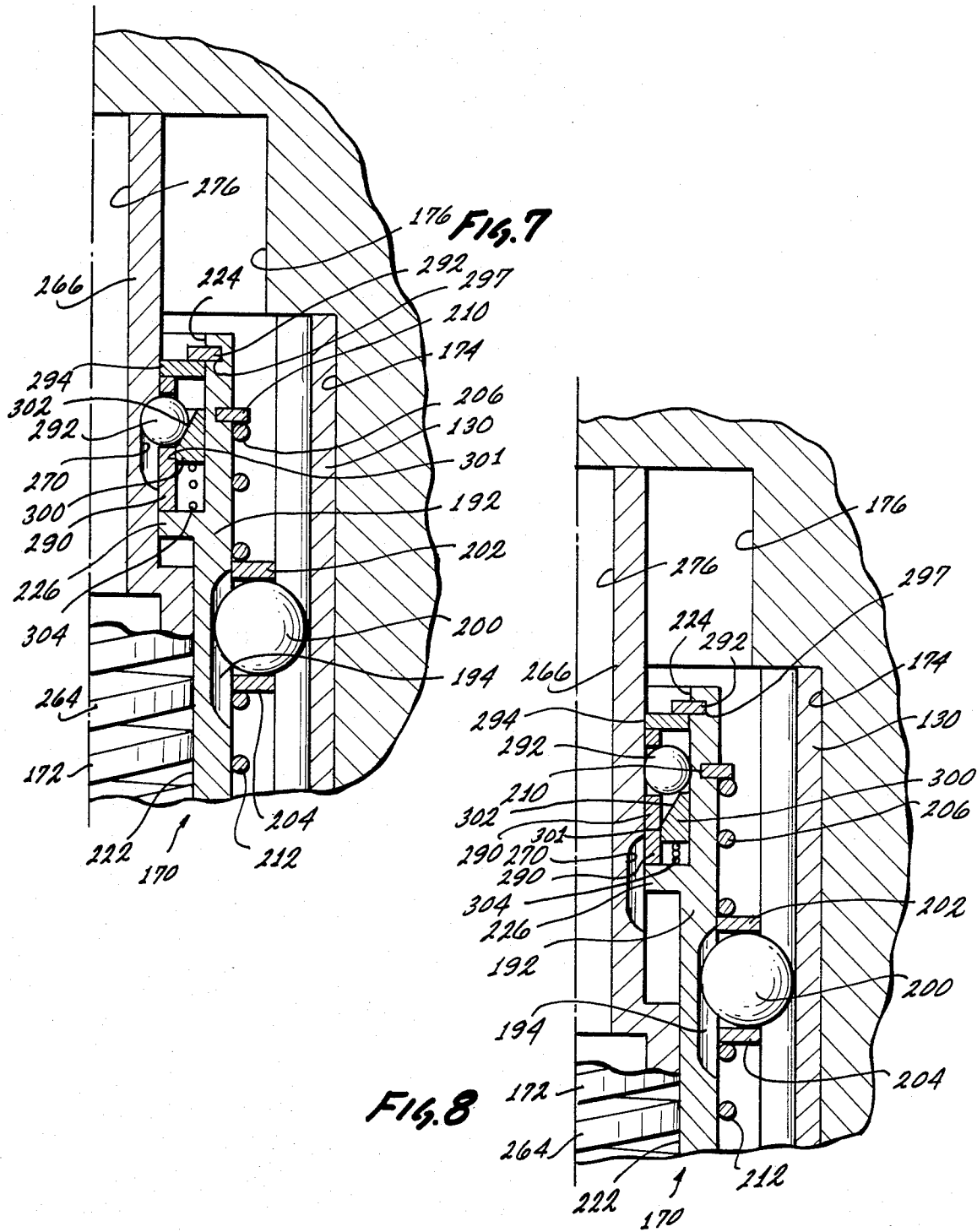

TAPPING ATTACHMENT ADAPTED FOR NUMERICAL COMPUTER CONTROL

BACKGROUND OF THE INVENTION

1. Field of the Invention

The field of the invention is that of tapping attachments and more especially a tapping attachment that is particularly adapted for use with machines adapted to numerical computer control.

2. Description of the Prior Art

Known prior art includes U.S. patents of the herein inventor U.S. Pat. Nos. 3,397,588; 3,717,892; 3,946,844; 3,999,642; 4,014,421; and, 4,029,429. The foregoing patents disclose various improvements in tapping attachments and generally reflect the state of the art in respect of related type tapping attachments.

Contempory advances in the art of automation have included automatic numerical computer control of machines and/or equipment with which tapping attachments are used for tapping, that is, the preparation of threads in previously drilled holes. At times the use of a number of different attachments is required for different types of work and/or work pieces that may require that the tapping be done with the work piece in different positions. Manual interchange of attachments is, of course, tedious and time consuming.

Modern numerical computer controlled equipment may have associated apparatus in the form of an automatic tool changer by means of which different tools, including tapping attachments can be automatically inserted or mounted. Such automatic tool changers can, of course, take different forms as contemporarily known.

To meet the needs of such modern contemporary equipment there is a need for an attachment having a variety of capabilities, and a very short length. Particularly, the art has been lacking in an attachment of shorter length, incorporating adjustable tension, compression and releasing means.

The herein invention, a preferred form of which is described hereinafter in detail, seeks to fulfill the need in the art as identified above and to overcome the lack of needed capabilities in presently known attachments.

SUMMARY OF THE INVENTION

A preferred form of the invention is described in detail hereinafter. The body of the attachment is configurated to be adapted to insertion or mounting by way of an automatic tool changer under numerical computer control. A tapping spindle which is relatively movable axially is carried by the attachment and may be driven by a ball drive assembly such as shown, for example, in U.S. Pat. No. 3,999,642

Associated with the spindle is a compression spring and a tension spring. A unique construction of these parts is provided wherein one spring is inside of the other, in this case the tension spring being inside of the compression spring wherein a shorter overall length of the attachment is realized. The compression spring is a unique type of spring which is formed by way of a groove cut into a metal cylinder forming a helical spring. This unit is a known type of commerical device in itself. This unit is formed with a head having screw threads which is threaded into a bore in the spindle itself. This unit is axially adjustable. The tension spring which allows the spindle to float, is within the helical compression spring. The threaded head at the end of the compression spring makes it possible to adjust this spring and the amount of cushion provided.

In some applications under numerical computer control, there is a need for the ability to vary the amount of tension cushion. It is possible that the machine may not feed fast enough to accommodate the rate at which tap taps into the hole or the hole may be a deeper one so that there is more need for relative axial movement of the spindle, that is, more tension cushion. There may also be need for an enlarged amount of compression cushion. For example, the machine maybe set to feed in ¾ of an inch. In the event that the machine is operating to feed in at the same rate that the tap is feeding into the hole and something should happen that the tap stops turning such as a result of the release of a torque release clutch, with the machine still feeding having been set for ¾ of an inch of advance, as can be seen a greater amount of cushion in the compression spring is needed to prevent breakage of tool or machine.

A further feature is provided in the attachment. Formed in the body of the spindle is an axial groove in which is fitted a ring, the depth of the groove being deeper than the size of the ring, that is, the diameter of the ring. This ring can collapse into the groove under a given amount of pressure and it can come up against the body of the attachment. The ring has a particular function. The tap is subject to wear and after some wear it is harder for it to start the tapping, that is, the cutting operation. It requires more pressure as it becomes duller in order to get the tap started. This leads to a variation in thread depth when a compression spring is employed to start the tap. Thus, there is a need for a hard start to assure that the tap starts to cut at the same point each time, thereby maintaining accurate thread depth. That is, when the ring abuts against the busing of the attachment this establishes the hard start, the ring in the groove being designed with precision to provide for the correct amount of force to collapse to provide for the hard start producing these functions.

Preferably the spindle is provided with another shallow groove in it, and at the time of sale of the article the said ring would be parked in the shallow groove and would only be put into the operational groove if the customer needed that function. This feature is primarily needed where the customer is concerned with accurate thread depth, not so much where a through hole is being dealt with.

A second embodiment of the invention is provided which has all of the capabilities of the first embodiment. As explained, in the previous embodiment the hard start feature is by way of a releaseable securement between the spindle and the body of the attachment. In the present embodiment the releasable securement is provided between the spindle and the adjustable cylindrical spring member which is within the spindle. This member has threaded engagement with a threaded bore within the spindle, so as to be adjustable and by reason of its adjustment, adjusted positions are provided for three different modes of operation. A tension spring is provided which resists outward movement of the spindle relative to the body and this spring is inside of the adjustable spring member carried by the spindle. By adjustment of the latter member the different modes of operation are realized. In a first mode the releasable securement providing the hard start is effective. In a second position the adjustable spring member is positioned so that the unit has all tension. In this mode there is no compression cushion feature. In a third position mid-way between the first and second positions, both tension and compression cushion is provided without the hard start.

The manner of attaining these capabilities is described in detail hereinafter.

In the light of the foregoing, the primary object of the invention is to realize a tapping attachment which can be constructed to function in 3 separate and distinct ways depending on the machine requirement with the shortest possible overall length, adapting it for use with numerically controlled machines.

Another object is to realize the foregoing object by way of an adjustable cylindrical spring member carried in a bore within the spindle and having a tension spring connected between the body of the attachment and the said spring means carried by the spindle.

Another object is to realize the capability in a tapping attachment having a spindle which is relatively movable axially, of providing for a hard start with respect to relative axial movement of the spindle so as to accommodate for the starting of a relatively dull tapping bit, so that under computer control the depth tapped will be accurate.

Another object is to realize the foregoing object by way of a releasable securement comprised of a collapsible ring in a circumferential groove in the spindle positioned so that the ring has to be collapsed by engagement with the body of the attachment before relative axial movement can occur.

Another object is to realize the hard start capability in the attachment by way of providing a releasable securement as between the spindle and the compression spring member which is adjustably carried in the bore of the spindle.

Another object is to realize the releasable securement by way of a ball element and wedge element, the respective elements being carried by a part of the spindle and a part of the cylindrical spring member within the spindle, the wedge element being resiliently biased so that it can release the releasable securement in response to axial force urging relative movement as between the spindle and the spring member.

Further objects and additional advantages of the invention will become apparent from the following detailed description and annexed drawings.

BRIEF DESCRIPTION OF THE DRAWINGS

FIG. 1 is a schematic pictorial view of an automatic tool changer shown associated with a vertical mill;

FIG. 2 is a cross-sectional view of a preferred form of the tapping attachment of the invention;

FIG. 3 is an exploded view of the attachment of FIG. 2;

FIG. 4 is a cross-sectional view of a preferred modified form of the attachment of the invention;

FIG. 5 is an enlarged sectional view taken along the line 5—5 of FIG. 4;

FIG. 6 is an exploded view of interior parts shown in FIG. 4;

FIG. 7 is an enlarged cross-sectional view of an upper part of the spindle of FIG. 4;

FIG. 8 is an enlarged cross sectional view like FIG. 7 showing the parts in another position.

DESCRIPTION OF ONE EMBODIMENT AND MODE OF PRACTICE

As explained in the foregoing a machine carrying tapping attachments may operate under numerical computer control with automatic means for automatically inserting or mounting different tapping attachments in response to the computer controls.

FIG. 1 shows schematically a vertical mill designated generally at 10, with an associated automatic tool changer designated generally at 12 having a tool changing arm 14 holding a tapping attachment 16. As explained in the foregoing the tool changer can automatically change, that is, insert different tool changers in the mill. What is shown in FIG. 1 is exemplary of equipment known in the prior art. Such equipment can be of different types, one of the other types embodying a tool carousel which can be advanced in either direction in response to numerical computer control for changing attachments.

A preferred form of attachment of the invention is shown in detail in FIGS. 2 and 3, the attachment having a unique construction whereby it is of a relatively short overall length adapting it for utilization in the equipment under numerical computer control. Numeral 20 designates the body of the attachment The body has cylindrical part 22 at its end. The upper part of the body is tapered as shown at 24. The body has an extending circular part or band 28 which has a circumferential peripheral groove 30, as may be seen. The part 28 has two squares cut out one of which is shown at 32 to hold the part 28 in position in the machine spindle.

The internal construction of the attachment is shown in the cross-sectional view of the FIG. 2, with the parts shown separate in the exploded view of FIG. 3.

In the upper part 24 of the attachment there is a threaded bore 40 and at the end of it there is a tapered counter bore 41, a cylindrical counter bore 42 and an end tapered counter bore 43. These bores cooperate with the automatic tool changer.

Within the lower part of the attachment is a relatively large bore 50. See FIG. 2. At the upper end of the bore 50 there is a first smaller bore 52; another small bore 54; a still smaller bore 56; and a counter bore 58 which is larger than bore 56, which is at the bottom of the bore 40.

The spindle of the attachment which is carried by it and which can move axially relatively with respect to the body is designated generally by the numeral 64. See FIG. 3. At the lower end of the spindle 64 is carried an adapter assembly carrying the tapping tool, which will be referred to again presently.

The spindle 64 has a cylindrical part 66 at the lower end of which is a cylindrical enlargement shown having in it two diametrically opposed cutouts, as designated at 69 and 70. The part 66 has a circumferential groove in it which receives a flexible ring as will be described presently.

The spindle 64 has a part 76 of smaller diameter above the part 66 and at the upper end of this part is a groove 77 adapted to receive a snap ring as will be described.

In the sides of the part 76 there are provided a group of preferably three axial slots or grooves as designated at 80 which cooperate with drive balls as will be described.

In the lower part 66 of the spindle 64 it has a threaded bore 82 which receives an adjustable metal spring member identified by the numeral 84. This member has a threaded head 86 which threads into the bore 82, the head having screw driver slot 87. The spring part 88 is cylindrical having a helical groove cut in it forming a spring.

The part 88 is telescoped into the bore 90 in the spindle 64. In FIG. 2 it is shown in its upper most position wherein it is all the way up to the end of the bore 52.

The spring member 84 has a bore 94 in it, as may be seen in FIG. 2, having a conical bottom as shown at 95. Number 96 designates a pin extending transversely through a diametrical bore in the part 88. See FIG. 3. Within the bore 94 is a tension spring 100 the lower end of which is hooked over the pin 96.

Numeral 102 designates a fitting having a flange part which fits into the the counter bore 58 as may be seen in FIG. 2. It has an extending lug 104 with a hole in it and the upper end of the spring 100 is hooked into the hole.

From the foregoing, as may be observed, the unit 84 provides for compression when the spindle 64 moves upwardly relatively as repsect body 20.

The spring 100 provides tension when the spindle 64 moves relatively away from the body 20. The mechanism provides for ball drive of the spindle 64 from the body 20, the structure being like that of the U.S. Pat. No. 3,999,642 for example, which patent is incorporated herein by reference.

Carried on the smaller upper part 76 of the spindle 64 are coil springs 110 and 112. See FIG. 3. The upper spring 110 bears against the washer 114 and the lower spring 112 bears against the washer 116. The upper end of spring 110 bears against a snap ring 120.

Numerals 121, 122, and 123, designate drive balls that fit into the axial slots 80 in the part 76 of the spindle for purposes of driving the spindle as will be described. See FIG. 3.

Numeral 130 designites a cylindrical drive sleeve which fits in the bore 50 in the body 20 and it is held in position by a set screw 132 that threads into a radial bore 133 as may be seen in FIG. 2. The drive sleeve 133 has axial ribs or lands in it as designated at 136, 137, and 138, with axial grooves 139, 140, and 141 in between the axial ribs. At an intermediate position in the ribs there are provided interuptions one of which is designated at 144 in FIG. 2. When the spindle 64 reaches a predetermined position relative to the body 20 at which the balls 121, 122, 123, are at or adjacent to the interuptions 144 drive is discontinued and only continues upon relative axial movement of the spindle 64 to being the balls into engagement with the ribs on the drive collar below the interuptions 144. This construction is like that of U.S. Pat. No. 3,999,642 which is incorporated herein by reference.

Numeral 148 designates a bushing which has a slip fit in the bore 50 in a position below the drive collar 130. It has a taper 149 at its lower internal edge and it is held by a snap ring 152 as may be seen in FIG. 2.

The part 66 of the spindle 64 has an annular groove in it, as designated by the numeral 150. An expandable ring 151 fits into this groove. The spring is of a size that when greater pressure is exerted on it it can collapse further into the groove for a purpose which will be described presently.

The ring 151 provides for a hard start of the attachment for reasons explained in the foregoing and for reasons explained in detail hereinafter in connection with FIGS. 4–7. When tapping is to begin, if the bit is dull the spindle 64 will push up into the body until the ring 151 engages the bottom of bushing 148. At a predetermined force the spindle will collapse into the groove 150 and the spindle can then push up into the body to prevent damage to tool or machines if tap stops rotating due to clutch slippage or if the hole has accidently not been drilled prior to tapping.

Number 153 designates a groove similar to the groove 150 further down on the spindle, which is a parking groove and in which the ring 151 can be parked when it is not desired or needed to have the hard start feature.

At the end of the spindle 64 is carried the quick change assembly. The end of the spindle 64 is enlarged as shown at 153 and it carries the ring 154 in the upper part of which is a counter bore 155 within which are wave washers 156 and 157 and washer 158 is held by snap ring 159. Numeral 160 designates a removable adaptor carrying tap 169. See FIG. 2.

The adaptor 160 has an annular groove in it, as shown at 161. The lower part of the spindle has radial holes as shown at 162 and 163 in which are balls 164 and 165. The ring 154 has an annular groove 166 in it to accommodate the balls 164 and 165. When the ring 154 is lifted to place the annular groove 161 in the position of the balls 164 and 165 the balls are forced outwardly through the radial holes 162 and 163 into the annular groove 161 so that they release the adaptor. Then the ring 154 is moved into a position as shown in FIG. 2 the balls 164 and 165 can move inwardly into groove 161 in the ring 154 so as to hold the adaptor 160. The quick change assembly as shown in FIG. 2, is the same as the one illustrated in the enlarged view of FIG. 5 and described hereinafter.

DESCRIPTION OF A PREFERRED EMBODIMENT AND BEST MODE OF PRACTICE

The present embodiment involves certain features not present in the first embodiment. The features relate particularly to the hard start capability referred to in the foregoing and which will be dealt with in detail hereinafter. Three modes of operation are provided for so that the attachment actually has the capabilities of three different attachments.

In the first mode of operation the hard start is provided for to accommodate the precision of the attachment for operating with a dull tap. The safety cushions are available in this mode of operation, by way of springs as will be explained.

In a second mode of operation an adjustment is made so that the compression cushion is not available, but only tension.

In a third mode of operation a spring member is adjusted to another position mid-way between the first and second positions, in which there is both tension and compresson cushion, but without the hard start. The nature of these three modes will be explained in detail hereinafter.

FIG. 4 is a cross-sectional view of the present embodiment. To the extent that parts are the same as in the previous embodiment the same reference characters appear, or the same characters primed.

In the present embodiment the spindle as a whole is designated by the numeral 170. Within the spindle is a spring member 172 embodying a helical spring, which is similar to that of the previous embodiment and which will be referred to again presently. See FIGS. 4 and 6.

Referring to FIG. 4, the body 20' at the lower part has a bore 174. At the upper part of this bore there is a smaller bore 176 and above this bore is a still smaller bore 178. At the bottom of the bore 40, there is a larger bore 182 and between this bore and the bore 40 is a bore 184 having limited axially extent. The upper bores in the body 20' cooperate with the machine 10 shown in FIG. 1. The bore 178 commuicates with the bore 182.

Within the bore 174 is the drive sleeve 130 which is like that of the previous embodiment and therefore it does not need to be described again. Below the drive sleeve 130 is a bushing 148' that has a slip fit in the bore 174. Its lower part as designated at 185 is of smaller diameter. It is held in position by a snap ring 188. The spindle 170 fits in the bushing 148'.

The spindle 170 has an upper part designated at 192, there being a square shoulder 193 between this part and the lower part of the spindle. The upper part of the spindle can be seen in the enlarged views 7 and 8. It has equally spaced axial slots in its outer side walls, one of which may be seen at 194 in FIG. 7. Drive balls are provided as in the previous embodiment which engage in the axial grooves in the drive sleeve 130 and in the axial grooves 194. One of the balls is shown at 200, in FIG. 7. On opposite sides of the balls are washers as designated at 202 and 204. The spring 206 acts on the washer 202 and the other end of this spring engages a snap ring 210. The washer 204 engages a spring 212 and the lower end of this spring engages the annular shoulder 193. The drive sleeve 130 has interruptions as designated at 214, (FIG. 4) like those of the previous embodiment which can interrupt the drive as previously described in connection with the previous embodiment.

The spindle 170 near the lower part has a threaded bore 220 into which the spring member 172 can be threaded, as will be described. The spindle 170 has an intermediate smaller bore 222. The bore 222 can be seen in the enlarged view of FIG. 7. At the upper end of the part 192 there is another bore 224. Between bores 222 and 224 is a circular rib 226. The hard start mechanism is positioned in the bore 224 as will be described presently.

At the lower end of the spindle 170 is an enlarged part 230 and a quick change unit is provided for quickly changing a tap carried by an adapter, identified by the numeral 232. The lower part of the spindle 170 has a bore 234 that receives the adapter 232, this bore being slightly larger than the bore 220.

Fitting around the spindle 170 is a ring 236, which is part of the quick change mechanism. In the upper part of this ring is a counter bore 238 and fitting in this counter bore are wave washers 239, 240, and 241. These washers bear against a snap ring 224, fitting in groove 245 in the spindle 170. At the lower part of the ring 236 in its inside circumference is formed an annular groove 250. This groove cooperates with balls 252 and 254, which cooperate with axial holes, one of which is shown at 256 in the enlarged view of FIG. 5.

At the upper part of the adapter 232 there is a circumferential groove 260, the inside surface of which is arcuate in cross section to accommodate the balls 252 and 254.

The operation of the quick change mechanism is that when the ring 236 is lowered so that the annular groove as shown at 250, is not opposite to the balls 252 and 254, the balls are forced inwardly in the radial holes such as the hole 256 so that they engage in the circumferential groove 260 and the adaptor 232 is held in position.

When ring 236 is lifted to bring the annular groove 250 in line with the balls 252 and 254, the balls can be moved outwardly in the axial holes so as to release the adaptor 232 which can be removed and another one with a different tap substituted.

Next will be described the spring member 172. This member has a threaded head 262 with a screw driver slot 263 and this head can be threaded into the threaded bore 220 in the spindle 170. This member is milled as shown so as to have a helical spring part as designated at 264, like that of the previous embodiment. The upper part of the member 172 is of a smaller diameter as designated at 266. This part has in it, in its outside surface a circumferential groove or cutout as designated at 270, as may be seen in the enlarged view of FIG. 7. The hard start mechanism cooperates with this groove as will be described.

The upper part 266 of the member 172 has a bore as designated at 276. See FIG. 7.

The spindle 170 is suspended by a coil spring as designated at 280. The lower end of this spring is attached to a transverse pin 261, extending through the lower part of the member 172. The upper end of the spring is attached to a hole 282 in lug 283 on a holding disc 284 riding on thrust bearing 285 at the bottom of the bore 182 and over the bore 178. It will be understood that the spring 280 provides a tension cushion for the spindle 170 and allows for axial float of the spindle.

Next will be described the hard start mechanism of the attachment and the three different modes of operation. This mechanism is illustrated in the enlarged views of FIGS. 7 and 8, which show two different positions. It will be observed that FIGS. 4, 7, and 8, show the upper part 266 of the spring member 172 in the position wherein it is against the end of the bore 176.

Positioned in the bore 224 in the upper end of the spindle 170, as may be seen in FIGS. 7 and 8, is a ball retainer or sleeve 290 that has holes in its sides for retaining balls, for example four, such as shown at 292a, 292b, 292c, and 292d, in FIGS. 6 and 7. The sleeve 290 is held at the bottom end by the circumferental rib 226 on the inside of the upper end of spindle 170. At its upper end it is held by washer 294 which in turn is held by a snap ring 292 fitting in a circumferental groove 297 in the bore 224. The ball retainer sleeve 290 is spaced inwardly from the side walls of the bore 224. In the bore 224 is a ring 300 having a bore 301 through which the sleeve 290 extends. The upper part of the bore 301 through which the sleeve 290 extends. The upper part of the bore 301 in the ring 300 is beveled so that it is on a slant as shown at 302 forming wedge surfaces cooperating with the balls 292. Below is a compression spring 304 providing resiliency, or wave washers could be used.

From the foregoing it will be seen that the spindle is provided with both tension cushion by the spring 280 and compression cushion by the spring part 264 of the member 172.

The purpose of the structure as described is for the capability of a hard start for the tapping operation. The purpose of the hard start is as follows.

During the tapping operation the tapping bit, of course, gets duller as it is used. The duller it is the harder it is to get it started tapping. The hard start mechanism as described compensates for the bit having become duller. It is mentioned again that the spindle is backed against the spring 264 of the member 172, so that it is not held in a solid position such that the bit would have to start cutting no matter how dull it is. Due to the fact that the spindle can push against the spring it can be seen that there is a need for the hard start mechanism so that the bit will always start cutting at exactly the same position. The hard start mechanism will force it to start to cut rather than letting it push back into the attachment against the spring.

The importance of the hard start can readily be understood recognizing that the attachment may be controlled by the numerical control apparatus, that is, a computer. That is with the hard start, however, the computer is programmed so it will know that the bit is starting. For example, if the machine is programmed to tap ½ inch into the hole and there is a dull bit, at the starting point when the computer thinks that the bit is starting to tap and that because of a dull bit instead of starting to tap, the spindle pushes back ⅛ or ⅜ of an inch before the bit starts to cut then when the computer completes its programmed intention of tapping a ½ inch amount it will not get the full amount because of the amount that the spindle backed in against the spring. Also, assuming that no hole had been drilled at all and the machine is trying to tap into a place where there is no hole the force will overcome the hard start and then the attachment has the benefit of the safety that the spindle can back in against the spring.

Referring again to FIG. 7 the operation is as follows. As the attempt to tap is started the spindle 170 will be pushed upwardly so that the balls 292 will be carried to the upper edge of the groove 270. The bevel or the slanting surface 302 on the inside of the ring 300 will be forced against the balls so that the ring will be forced downwardly against the spring 304 at some upward force, which is the hard starting force. If this force is overcome the spindle 170 can then move upwardly against the compression of the spring part 264 of the member 172.

As previously explained the member 172 is adjustable in threaded bore 220. The member 172 is adjustable to provide three modes of operation. It can be adjusted downwardly so that the balls are not engaged in the helical groove 270, but are just against a smooth surface of the solid portion of the part 266 of the member 172. The first mode of operation is that described above. The second mode is wherein the member 172 is adjusted downwardly within the spindle far enough so that it does not protrude above the spindle so that there is no compression capability provided for the spindle, but only tension cushion provided by the spring 280.

A third mode of operation is possible wherein the member 172 is adjusted to a position mid-way between the positions for modes 1 and 2 as described above in which both tension cushion and compression cushion are provided, but without the hard start.

The first position with the hard start realizes the capability of a very accurate thread depth especially when the release of the driving balls in the neutral position is employed as shown in U.S. Pat. No. 3,999,642.

In the second position wherein there is no compression cushion but only tension, if the machine is feeding slower than the tap for example, compensation is provided. This mode of operation is adapted for situations where the depth of the hole is not a critical factor.

With respect to the third mode of operation, wherein both tension cushion and compression are provided without a hard start, this adjustment is adapted for a machine that may be feeding either slower or faster than the tap is moving a compression will be provided either way. If it is going too fast the compression feature will allow the spindle to push up into the attachment. If it is slow relatively, the spindle can move down or outwardly stretching the tension spring.

From the foregoing the importance of the adjustment of the spring member 172 will be realized. It provides for adjustment to adapt to the three modes of operation so in effect the attachment has the capabilities of three different tools, which would otherwise have to be provided. Thus, the significance of the invention in relation to computer control of the machine is apparent.

In addition to the advantages pointed out, especially as to the adjustment by having the tension spring inside of the helical compression spring, it becomes possible to construct the attachment in relatively short overall lengths which is important for reasons as pointed out in the foregoing.

I claim:

1. A tapping attachment including means providing a body part, a rotatable spindle carried by said body part which is relatively movable axially relative to said body part, said spindle having an axial bore and A compression spring means carried in said bore in the form of a cylindrical member constructed at least in part as a helical spring and having a head part threadably engaging said bore of said spindle and providing a compression cushion allowing relative axial movement as between said spindle and said body part against said compression spring means, said compression spring means being adjustable to vary the amount of cushion independent of the position of said spindle relative to said body part; and a tension spring means in said bore connected to said compression spring means providing a tension cushion allowing relative axial movement as between said spindle and said body part against said tension spring means.

2. A tapping attachment including means providing a body part, a rotatable spindle carried by said body part which is movable axially relative to said body part, said spindle having an axial bore and compression spring means carried in said bore, a tension spring means carried in said bore providing a tension cushion allowing relative axial movement as between said spindle and said body part against said tension spring means, said tension spring means being connected to said compression spring means, said compression spring means being adjustable to simultaneously vary the amount of tension cushion and compression cushion, said compression spring means directly contacting said body part so that the resistance of said compression spring means is transmitted directly to said body part so that the overall length of the attachment is reduced, said compression spring means being in the form of a cylindrical member having helical grooves therein defining a spring and having a head part threadably engaging said bore of said spindle, said cylindrical member being of unitary construction with said head part so that the resistance of said compression spring means is directly transmitted to said spindle.

3. A tapping attachment as in claim 2: said compression spring means being axially adjustable relative to said spindle to eliminate direct contact of said compression spring means with said body part so that said compression cushion is thereby eliminated.

* * * * *